Aug. 6, 1935.  Y. J. NYVALL  2,010,641
FISH LURE
Filed July 18, 1933
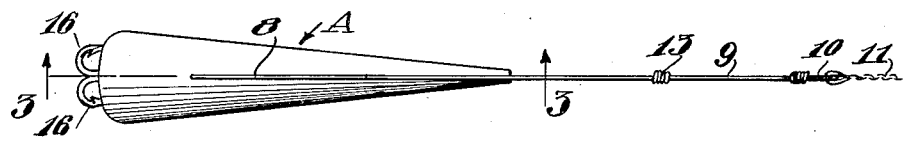
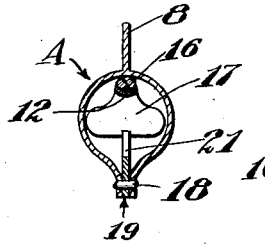
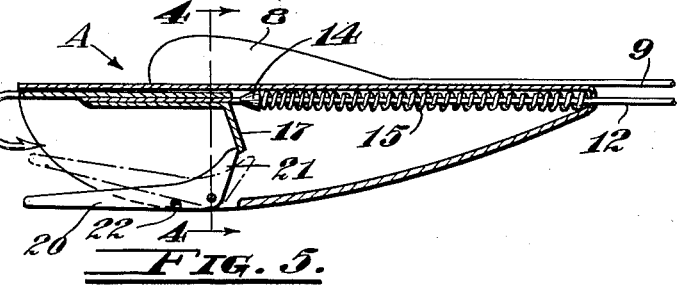
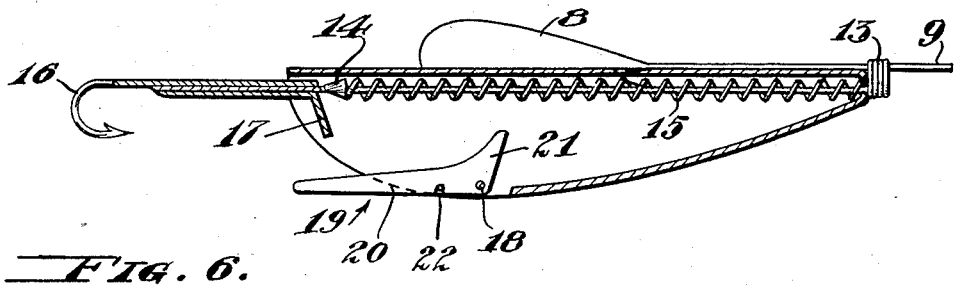
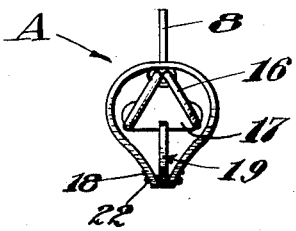
Inventor
Yngve J. Nyvall.

Patented Aug. 6, 1935

2,010,641

UNITED STATES PATENT OFFICE 2,010,641

FISH LURE

Yngve J. Nyvall, San Pedro, Calif.

Application July 18, 1933, Serial No. 680,950

1 Claim. (Cl. 43—35)

This invention relates to a fish lure, and more particularly pertains to a fish lure of the plug type in which one or more hooks are mounted in a hollow plug in such manner that they may be concealed and on the release of a trip mechanism be automatically projected into an operative position.

An object of the invention is to provide a fish lure of the above character which is substantially weed proof, that is, in which the hooks are so arranged that the lure may be towed through weeds, kelp and the like during fishing operations with little likelihood of the hook becoming snagged.

Another object is to provide an arrangement whereby the concealed hook will, on the release of a trigger, be forcibly projected in a rearward direction from the plug, that is in a direction opposite that in which the plug is advancing while being towed.

Another object is to provide a device of the above character which is simple in construction and readily assembled, and thereby adapted to be manufactured and sold at a small cost.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a view of the lure as seen in side elevation;

Fig. 2 is a plan view;

Fig. 3 is a view in longitudinal section and elevation as seen on the line 3—3 of Fig. 2;

Fig. 4 is a detail in cross section taken on the line 4—4 of Fig. 3;

Fig. 5 is a view in longitudinal section showing the parts as arranged with the hook disposed in its advanced or extended position relative to the plug;

Fig. 6 is posterior end view of the device.

Referring to the drawing more specifically, A indicates generally the body or plug portion of the lure, which comprises a shell preferably formed of sheet metal, formed to provide a tubular structure, which tapers from a rearward end toward a forward end but has one side thereof constituting its upper edge portion extending on a straight line and fitted with a fin 8. The lower marginal portions of the sides of the shell converge to form a relatively thin or narrow margin opposite the top wall. Extending from the apex portion of the shell in alignment with the upper edge thereof is a stem 9 the outer end of which is formed with a loop pin for engagement with a line or cord 11. Mounted interiorly of the shell or longitudinal movement relative thereto and extending through the apex portion thereof is a rod 12 the outer end of which is formed with a loop 13 encircling the stem 9 in slidable contact therewith. The inner end of the stem 12 is formed with a shoulder 14 and interposed between said shoulder and the apex end of the shell is a spiral spring 15 wound around the bar 12 in an advanced position, that is with the loop 13 abutting against the shell. Mounted on the inner end of the bar 12 in fixed engagement therewith is a fish hook 16; a pair of such hooks being here shown as provided and arranged along side of each other with their end portions inclined outwardly relative to each other. Projecting downwardly from the base portion of the hook is a flange 17 and mounted on a pivot pin 18 is a trigger 19 in the form of a bell crank lever having a long arm portion 20 which projects in the direction of the length of the shell and normally protrudes a short distance from the open posterior end portion of the latter.

The short arm portion 21 of the trigger is adapted to be engaged with the flange 17 as particularly shown in Fig. 3 to hold the hook 16 in a retracted position in opposition to the spring 15.

The flange 17 projects downwardly and laterally from the bar and slidably contacts the inner wall of the shell and coacts therewith to guide the rear portion of the bar.

A stop 22 is provided for limiting downward movement of the trigger arm 20.

The shell is so formed that the lower wall of its forward portion will extend in front of the trigger and thus act as a guard or shield to minimize possibility of the trigger being accidentally released on pulling the device through weeds, kelp and the like.

In the operation of the invention the hook 16 on the bar 12 is disposed in a retracted position as shown in Figs. 1, 2, and 3, that is with the hooks disposed in such close proximity to the outer end of the shell as not to be liable to become fouled or snagged by weeds, kelp and the like. The hook is maintained in this advanced position by the trigger as particularly shown in Fig. 3.

On a strike being made the protruding end portion of the arm 19 will be swung inwardly as indicated in dotted lines in Fig. 3 on the mouth of the fish being closed thereagainst, thus releasing the flange 17 and causing the spring 15 to suddenly project the hook into the mouth or throat of the fish thereby insuring a catch.

I claim:

A fish lure comprising a tubular body, a bar slidably supported by said body and having one end portion extending interiorly of said body, a hook carried by said bar, a spring normally holding said bar in an advanced position with said hook protruding from said body, a trigger arm carried by said body engageable with said bar to hold said hook in a retracted position in opposition to said spring, said trigger having an extension leading rearwardly from the lower portion of said body, said body having a tapered forward end portion the lower wall of which extends in front of said trigger and forms a shield therefor.

YNGVE J. NYVALL.